US005543237A

United States Patent [19]
Watanabe

[11] Patent Number: 5,543,237
[45] Date of Patent: Aug. 6, 1996

[54] INORGANIC THIN FILM ELECTROLUMINESCENT DEVICE HAVING AN EMISSION LAYER

[75] Inventor: Masao Watanabe, Minami-ashigara, Japan

[73] Assignee: Fuji Xerox Co., Ltd., Tokyo, Japan

[21] Appl. No.: 118,394

[22] Filed: Sep. 9, 1993

[30] Foreign Application Priority Data

Sep. 14, 1992 [JP] Japan .................................. 4-269082

[51] Int. Cl.$^6$ .................................................. H05B 33/14
[52] U.S. Cl. ......................... 428/691; 428/696; 428/697; 428/917; 313/503
[58] Field of Search ................................ 428/689, 690, 428/691, 917, 696, 697, 702; 252/301.4 R, 301.4 H; 250/483.1, 486.1; 313/503, 504, 505, 506, 507, 508, 509

[56] References Cited

U.S. PATENT DOCUMENTS

| | | | |
|---|---|---|---|
| 4,532,071 | 7/1985 | Nakamura | 252/301.4 H |
| 4,663,563 | 5/1987 | Taya | 252/301.4 H |
| 4,689,278 | 8/1987 | Umemoto | 428/917 |
| 4,894,548 | 1/1990 | Takahashi | 252/301.4 H |
| 5,086,252 | 2/1992 | Kido | 252/301.4 H |
| 5,227,254 | 7/1993 | Brixner | 428/917 |

FOREIGN PATENT DOCUMENTS 3-187191   8/1991   Japan .

OTHER PUBLICATIONS

R. L. Amster, "Photosensitization of Terbium Fluorescence by Europium in CaF$_2$", J. Electrochem. Soc.: Solid State Science, Jun. 1970, pp. 791–794, vol. 117, No. 6.

Kazakov, "Electroluminescence of CaF$_2$ (Tb$^{3+}$) Crystals", Optics and Spectroscopy, 26 (1969) 176.

Suyama, T, et al. "New Type of Thin–Film Electroluminescent Device Having a Multilayer Structure", Appl. Phys. Lett., 41, vol. 5, Sep. 1982.

William F., "Some New Aspects of Germanate and Fluoride Phosphors," Journal of the Optical Society of America, vol. 37, No. 4, New York (1947).

Crawford, J. et al., "Electronic Processes in Zinc Fluoride and in the Manganese–Activated Zinc Fluoride Phosphor," The Journal for Chemical Physics, vol. 18, No. 6, New York (1950).

Morton, D. et al., "A New Thin–Film Electroluminescent Material–ZnF$_2$:Mn$^a$,"Appl. Phys. Lett. 35, vol. 9, New York (1979).

Miura, N. et al., "Strong Ultraviolt–Emitting ZnF$_2$: Gd Thin Film Electroluminescent Device," Japanese Journal of Applied Physics, vol. 30, No. 10B Oct. 1990, pp. L1815–L1816.

Miura, N. et al., "Electroluminescence of ZnF$_2$ Thin–Films Doped with Rare–Earth Ions," Japanese Journal of Applied Physics, vol. 31, Part I, No. 1, pp. 51–59, Jan. 1992.

Suyama, T. et al., "New Type of Thin–Film Electroluminescent Device Having a Multilayer Structure," Appl. Phys. Lett., 41, vol. 5, Sep. 1982.

Japanese Abstract 03–187191.

Primary Examiner—Ellis P. Robinson
Assistant Examiner—Timothy M. Speer
Attorney, Agent, or Firm—Oliff & Berridge

[57] ABSTRACT

An inorganic thin film EL device comprises, on an insulating substrate 1, a back electrode 2, an insulating layer 3, a light emission layer 4, an insulating layer 3, and a transparent electrode 5 formed on the substrate 1 in this order. The emission layer comprises a fluoride of an alkaline earth metal and at least one member selected from the group consisting of rare earth element metals and compounds thereof at a mixing ratio by weight of 10:90 to 95:5. The rare earth element is, for example, cerium, praseodymium, neodium, samarium, europium, gadolinium, terbium, dysprosium, holmium, erbium, thulium, ytterbium and mixture thereof. The compounds may be those compounds of the rare earth elements and fluorine, chlorine, bromine, iodine and oxygen.

19 Claims, 1 Drawing Sheet

INORGANIC THIN FILM ELECTROLUMINESCENT DEVICE HAVING AN EMISSION LAYER

BACKGROUND OF THE INVENTION

1. Field of the Invention

This invention relates to electroluminescent (EL) devices and more particularly to inorganic thin film EL devices which are utilizable as a plane light source or a display device.

2. Description of the Prior Art

Attention has now been paid to applications of inorganic thin film EL devices as a flat panel display device or a plane light source. For this purpose, there have been hitherto used inorganic fluorescent materials which comprise a matrix selected from at least one of ZnS, CaS and SrS, which is doped with not larger than 3 atomic percent of at least one element selected from Mn, Tb, Sn, Ce, Eu, Sm, Tm and the like as an emission center (Japanese Laid-open Patent Application No. 3-187191).

Of these, ZnS:Mn has been studied for use as an orange light emission fluorescent material and has been utilized as a flat panel display device because of its good characteristics such as luminance, life and the like. Moreover, zinc sulfides have been widely studied including ZnS:Tb used as a green light emission fluorescent material. Other types of fluorescent materials using alkaline earth metal sulfide matrices have also been studied extensively, including SrS:Ce as a blue light emission fluorescent material, CaS:Eu as a red light emission fluorescent material, CaS:Ce as a green light emission fluorescent material, and the like.

In view of the emission mechanism of fluorescent materials, with transition metals such as Mn, electrons of the matrix are directly collided with one another to emit a fluorescence. With alkaline earth metals, a large proportion of the light emission depends on the transition of an energy corresponding to the band gap of the matrix. The sulfides of alkaline earth metals have a band gap energy ranging from 4.3 to 4.4 eV and that of ZnS is 3.6 eV. In order to obtain blue to UV light emission requiring high energies, the band gap energy of these compounds is not so high. Thus, studies have been made on matrices having high band gap energies such as $ZnF_2$:Gd (7 to 8 eV), (J.J.A.P., Vol. 10B(1991), p. 1815–1816) and $CaF_2$:Eu (Appl. Phys. Lett., 41, 1982, p.462).

Inorganic fluorescent materials using the above-indicated sulfides other than ZnS:Mn are not satisfactory for use as a flat panel display device and a plane light source with respect to emission luminance, efficiency and life. In this sense, working color flat panel display devices have never been formed at present.

SUMMARY OF THE INVENTION

It is accordingly an object of the invention to provide an inorganic thin film EL device which can solve the problems involved in the prior art and which is capable of full color display at a working level.

It is another object of the invention to provide an inorganic thin film EL device which comprises a light emission layer composed of a fluoride of an alkaline earth metal and a rare earth element or a compound thereof whereby the device is able to emit light which is higher in luminance, longer in life and wider in the wavelength range than known counterparts.

It is a further object of the invention to provide an inorganic thin film EL device which is conveniently utilizable as a plane light source such as for display devices.

We made studies on inorganic fluorescent materials which are adapted for full color inorganic thin film EL devices. As a result, we found that a fluoride of an alkaline earth element permits rare earth elements or certain compounds thereof to be contained stably and exhibits a high band gap energy. More particularly, inorganic fluorescent materials having novel compositions which comprise combinations of fluorides of alkaline earth elements and rare earth elements or its compounds exhibit a high EL intensity. The invention is based on this finding.

More particularly, the above objects can be achieved, according to the invention, by an inorganic thin film EL device which comprises a light emission layer and a pair of electrodes at least one of which is optically transparent and which sandwich therebetween the light emission layer through an insulating layer formed on opposite sides of the light emission layer, the light emission layer consisting of from 10 to 95 wt % of a fluoride of an alkaline earth element and, correspondingly, from 90 to 5 wt % of at least one member selected from the group consisting of rare earth element metals and compounds thereof.

Of course, an insulating substrate may be provided to support one electrode thereon as will be described hereinafter.

BRIEF DESCRIPTION OF THE INVENTION

DETAILED DESCRIPTION OF THE PREFERRED EMBODIMENTS

Figure 1:
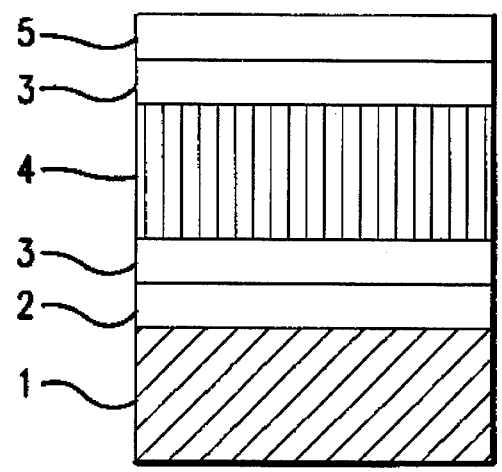
FIG. 1 is a schematic sectional view of an inorganic thin film EL device according to one embodiment of the invention illustrated in Example 1.

In the inorganic thin film EL device of the invention, the emission layer comprises as essential components a fluoride of an alkaline earth metal and a rare earth element metal or its compound used as a emission center. The alkaline earth metal fluoride serves to stabilize the rare earth element and has a band gap energy as high as 8 to 10 eV. The rare earth element serves as a donor when doped in the alkaline earth metal fluoride and can increase the concentration of carriers.

If the content of the rare earth element in the emission layer is too low, the alkaline earth metal fluoride becomes high in band gap energy, making a high insulating layer. In the practice of the invention, the rare earth element is doped in amounts larger than in known inorganic fluorescent materials, thereby increasing the carrier concentration in the matrix. Thus, the inorganic fluorescent material of the invention is able to emit a high luminance.

Examples of the alkaline earth metal include, for example, beryllium, calcium, magnesium, strontium and barium.

Examples of the rare earth element include cerium (Ce), praseodymium (Pr), neodium (Nd), samarium (Sm), europium (Eu), gadolinium (Gd), terbium (Tb), dysprosium (Dy), holmium (Ho), erbium (Er), thulium (Tm), ytterbium (Yb) and the like. These rare earth elements may be used singly or in combination.

The rare earth elements may be used as it is in the form of a metal, or may be in the form of compounds of the rare earth element and at least one element selected from fluorine, chloride, bromine, iodine and oxygen.

The alkaline earth metal fluoride and the rare earth element which are constituents of the emission layer of the inorganic thin film EL device are used at such a mixing ratio that the alkaline earth metal fluoride is present in an amount of from 10 to 95 wt % and the metal or compound of the rare earth element is present, correspondingly, in an amount of from 90 to 5 wt %.

The light emission layer is able to change the emitted light color from UV to IR light, depending on the type of rare earth element. For instance, UV light is obtained when gadolinium is added, blue light obtained by addition of praseodymium, green light obtained by addition of terbium, and orange light obtained by addition of europium.

The emission layer is formed by press sintering light-emitting components consisting of an alkaline earth metal fluoride and a rare earth element or its compound to obtain a pellet or by press molding the light-emitting components to which a co-activator, e.g. a low melting metal such as, for example, gold, zinc or the like, is added to obtain a pellet. The thus obtained pellet is used to form the emission layer by vacuum deposition techniques such as an electron beam vacuum deposition process, sputtering processes, CVD processes, MOCVD processes or the like. The thickness is preferably in the range of from 0.2 to 3.0 µm.

The inorganic thin film EL device of the invention should have an emission layer made of an inorganic fluorescent material and may be arranged in various forms.

Figure 2:
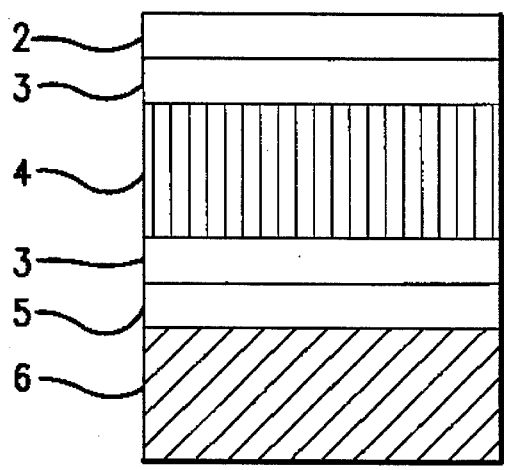
FIG. 2 is a schematic sectional view of an inorganic thin film EL device according to another embodiment of the invention illustrated in Example 2.

Reference is now made to the accompanying drawings. FIG. 1 shows an inorganic thin film EL device which comprises, on an insulating substrate 1, a back electrode 2, an insulating layer 3, an emission layer 4, an insulating layer 3, and a transparent electrode 5 formed on the insulating substrate 1 in this order. FIG. 2 shows an EL device according to another embodiment of the invention which comprises, on a transparent substrate 6, a transparent electrode 5, an insulating layer 3, an emission layer 4, an insulating layer 3 and a back electrode 2 formed on the substrate 6 in this order. In the arrangement of FIG. 1, a semiconductor layer may be provided between the emission layer 4 and the insulating layer 3 at opposite sides of the layer 4. More particularly, FIG. 3 shows an EL device which comprises, on an insulating substrate 1, a back electrode 2, an insulating layer 3, a semiconductor layer 7, an emission layer 4, a semiconductor layer 7, an insulating layer 3, and a transparent electrode 5 formed on the substrate 1 in this order.

Figure 3:
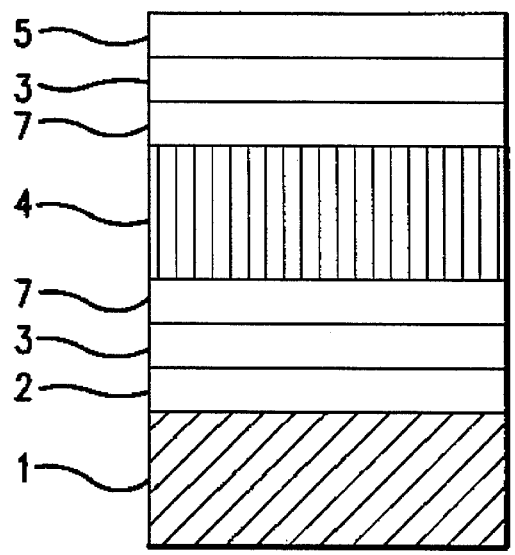
FIG. 3 is a schematic sectional view of an inorganic thin film EL device having semiconductor layers therein.

For fabricating these inorganic thin film EL devices, the respective layers are formed on the substrate in a similar manner as for the formation of the emission layer, thereby obtaining the EL devices having such structures as shown in FIGS. 1 to 3.

The substrate, electrodes and insulating layers of the EL devices may be, respectively, formed of known materials. For instance, the insulating layers may be made of $ZnF_2$, $CaF_2$, $MgF_2$, $SiN_x$, $TaO_x$, $Al_2O_3$, $Y_2O_3$, $PbTiO_3$ and the like. Each layer may have a double-layer structure. As a substrate, glass may be preferably used, and to prevent the diffusion of alkaline ions and the like from the glass substrate to the light emission layer, it is preferable to use a glass material free of alkaline ions. The above described insulating layer is made of an optically transparent material, and it is preferable to use an optically transparent material for an insulating layer.

In order to improve the luminance, the semiconductor layers shown in FIG. 3 may be formed as a carrier injection layer. The semiconductor used may be inorganic semiconductors including compounds of the elements of Groups II to VI of the periodic table such as hydrogenated amorphous silicon, CaS, MgS and the like, compounds of the elements of Groups II to VII of the periodic table such as $HgI_2$, compounds of the elements of Groups III to V of the periodic table such as AlAs, GaN and the like, compounds of the elements of Groups IV to VI of the periodic table such as $TiO_2$, $SnO_2$ and the like, and compounds of the elements of Groups V to VI of the periodic table such as $As_2O_3$, $Bi_2O_3$ and the like, and organic semiconductors such as polyvinyl carbazole, TPD and the like.

The invention is more particularly described by way of examples.

Example 1

This example illustrates an arrangement of FIG. 1.

10 wt % of gadolinium fluoride was mixed with 89 wt % of magnesium fluoride, to which 1 wt % of gold was added as a co-activator, followed by press molding at 800 $kg/cm^2$ to provide a pellet for vacuum deposition.

Subsequently, $ZnF_x$ was vacuum deposited by means of an electron beam on a back electrode 2 formed on an insulating substrate 1 as shown in FIG. 1, thereby forming a 2000 angstroms thick insulating layer 3. Thereafter, the pellet was subjected to vacuum deposition with an electron beam to form a 7000 angstroms thick emission layer 4. In a similar manner, another insulating layer 3 was formed on the emission layer 4, on which a transparent electrode 5 made of ITO was vacuum deposited in a thickness of 1000 angstroms.

In this manner, an inorganic thin film EL device of the type shown in FIG. 1 was fabricated and subjected to measurement of light emission characteristics, revealing that UV light having a peak in the vicinity of 312 nm was emitted at an intensity of 0.01 $mW/cm^2$.

Example 2

This example illustrates fabrication of the EL device of the type shown in FIG. 2.

10 wt % of erbium fluoride was mixed with 90 wt % of magnesium fluoride, followed by press sintering at 800 $kg/cm^2$ to obtain a pellet for vacuum deposition.

Subsequently, $CaF_2$ was vacuum deposited on a transparent electrode 5, which had been formed on a glass transparent substrate 6 and was made of ITO, in a thickness of 2000 angstroms by an electron beam, thereby forming an insulating layer 3. The pellet was vacuum deposited by means of an electron beam in a thickness of 7000 angstroms to form an emission layer 4. Another insulating layer 3 as formed on the emission layer 4 in the same manner as set out above, followed by further vacuum deposition of a 1000 angstroms thick aluminium back electrode 2.

The resultant inorganic thin film EL device was subjected to measurement of emission characteristics, revealing that green light was emitted with an intensity of 0.01 $mW/cm^2$.

Example 3

The general procedure of Example 2 was repeated except that 50 wt % of erbium fluoride and 50 wt % of magnesium fluoride were used, thereby obtaining an inorganic thin film EL device. The device was able to emit green light with an intensity of 0.06 mW/cm².

Example 4

The general procedure of Example 1 was repeated except that magnesium fluoride was replaced by calcium fluoride, thereby obtaining an inorganic thin film EL device. The device was able to emit ultraviolet light having a peak in the vicinity of 312 nm, with an intensity of 0.01 mW/cm².

Example 5

The general procedure of Example 2 was repeated except that magnesium fluoride was replaced by calcium fluoride, thereby obtaining an inorganic thin film EL device. The device was able to emit green light with an intensity of 0.01 mW/cm².

Example 6

The general procedure of Example 1 was repeated except that magnesium fluoride was replaced by strontium fluoride, thereby obtaining an inorganic thin film EL device. The device was able to emit ultraviolet light in the vicinity of 312 nm, with an intensity of 0.01 mW/cm².

Example 7

The general procedure of Example 2 was repeated except that magnesium fluoride was replaced by strontium fluoride, thereby obtaining an inorganic thin film EL device. The device was able to emit green light with an intensity of 0.01 mW/cm².

Example 8

The general procedure of Example 3 was repeated except that magnesium fluoride were replaced by strontium fluoride, thereby obtaining an inorganic thin film EL device. The device was able to emit green light with an intensity of 0.06 mW/cm².

Example 9

The general procedure of Example 7 was repeated except that 90 wt % of erbium fluoride and 10 wt % of strontium fluoride were used, thereby obtaining an inorganic thin film EL device. The device was able to emit green light with an intensity of 0.08 mW/cm².

Example 10

The general procedure of Example 1 was repeated except that magnesium fluoride were replaced by barium fluoride, thereby obtaining an inorganic thin film EL device. The device was able to emit UV light having a peak in the vicinity of 312 nm, with an intensity of 0.01 mW/cm².

Example 11

The general procedure of Example 2 was repeated except that magnesium fluoride was replaced by barium fluoride, thereby obtaining an inorganic thin film EL device. The device was able to emit green light with an intensity of 0.01 mW/cm².

Example 12

The general procedure of Example 11 was repeated except that 5 wt % of erbium fluoride and 95 wt % of barium fluoride were used, thereby obtaining an inorganic thin film EL device. The device was able to emit green light with an intensity of 0.01 mW/cm².

What is claimed is:

1. An inorganic thin film electroluminescent device comprising:
   a light emission layer, a pair of electrodes, and a pair of insulating layers, wherein at least one of the electrodes is optically transparent, each one of the pair of insulating layers is formed on an opposite side of the light emission layer, and the pair of insulating layers and the light emission layer are positioned between the pair of electrodes, the light emission layer comprising from 10 to 95 wt % of a fluoride of an alkaline earth metal and, correspondingly, from 90 to 5 wt % of at least one member selected from the group consisting of rare earth element metals and compounds thereof.

2. The inorganic thin film electroluminescent device of claim 1, wherein said alkaline earth metal is magnesium.

3. The inorganic thin film electroluminescent device of claim 1, wherein said alkaline earth metal is calcium.

4. The inorganic thin film electroluminescent device of claim 1, wherein said alkaline earth metal is strontium.

5. The inorganic thin film electroluminescent device of claim 1, wherein said alkaline earth metal is barium.

6. The inorganic thin film electroluminescent device of claim 1, wherein said alkaline earth metal is beryllium.

7. The inorganic thin film electroluminescent device of claim 1, wherein said at least one member is a rare earth element selected from the group consisting of cerium, praseodymium, neodium, samarium, europium, gadolinium, terbium, dysprosium, holmium, erbium, thulium, ytterbium and mixtures thereof.

8. The inorganic thin film electroluminescent device claim 1, wherein said at least one member is a compound of a rare earth element selected from the group consisting of compounds of said rare earth element and fluorine, chlorine, bromine, iodine, oxygen and mixtures thereof.

9. The inorganic thin film electroluminescent device of claim 1, further comprising an insulating substrate supporting an optically non-transparent electrode, the optically non-transparent electrode being one of the pair of electrodes.

10. The inorganic thin film electroluminescent device of claim 1, further comprising an optically transparent substrate supporting the optically transparent electrode.

11. The inorganic thin film electroluminescent device of claim 1, further comprising a pair of semiconductor layers, each semiconductor layer provided between said emission layer and a corresponding one of said insulating layers.

12. The inorganic thin film electroluminescent device of claim 11, wherein each semiconductor layer consists essentially of an inorganic semiconductor.

13. The inorganic thin film electroluminescent device of claim 11, wherein each semiconductor layer consists essentially of an organic semiconductor.

14. The inorganic thin film electroluminescent device of claim 1, wherein the light emission layer further comprises a co-activator comprising a metal.

15. The inorganic thin film electroluminescent device of claim 14, wherein the co-activator is gold or zinc.

16. The inorganic thin film electroluminescent device of claim 1, wherein the light emission layer has a thickness of from 0.2 to 3.0 µm.

17. An inorganic thin film electroluminescent device, comprising a light emission layer comprising from 10 to 95 wt % of a fluoride of an alkaline earth metal and from 90 to 5 wt % of at least one member selected from the group consisting of rare earth element metals and compounds thereof.

18. The inorganic thin film electroluminescent device of claim 17, wherein said at least one member is a rare earth element selected from the group consisting of cerium, praseodymium, neodium, samarium, europium, gadolinium, terbium, dysprosium, holmium, erbium, thulium, ytterbium and mixtures thereof.

19. The inorganic thin film electroluminescent device of claim 17, wherein said at least one member is a compound of a rare earth element selected from the group consisting of compounds of said rare earth element with fluorine, chlorine, bromine, iodine, or oxygen, and mixtures thereof.

* * * * *